United States Patent Office 3,147,316
Patented Sept. 1, 1964

3,147,316
HALOGENATED BUTYL RUBBER COMPOSITION
Leon S. Minckler, Jr., Metuchen, Delmer L. Cottle, Highland Park, and Theodore Lewis, Roselle, N.J., assignors to Esso Research and Engineering Company, a corporation of Delaware
No Drawing. Filed June 15, 1960, Ser. No. 36,116
13 Claims. (Cl. 260—846)

The present invention relates to an improved method of obtaining halogenated copolymer compositions suitable for vulcanization. More particularly, it deals with means for producing a halogenated butyl rubber composition having improved properties by a highly simplified manner.

It has recently been suggested that butyl rubber-type copolymers may be halogenated to give a halogenated rubber of superior properties. Copolymers of the above general class, particularly where the copolymers contain about 85 to 99.5 weight percent of a $C_4$ to $C_8$ isoolefin, e.g., isobutylene, with about 15 to 0.5 weight percent of a multiolefin of about 4 to 14 carbon atoms, e.g., myrcene, isoprene, butadiene, etc. are well known in the literature as "butyl rubber." For example, see "Synthetic Rubber," by G. S. Whitby, and U.S. Patent 2,356,128 among many others. Halogenated butyl rubber-type copolymers heretofore were produced by halogenating butyl rubber in a manner normally in solution, which does not substantially degrade its molecular weight but however gives a rubbery product of substantially different properties than the unhalogenated material.

Further, it has been suggested that certain polymethylol hydrocarbon substituted phenol resins are effective in curing butyl-rubber type polymers. Conventionally, the rubbery copolymer was blended with the polymethylol phenol resin on a mill along with other compounding ingredients and then subjected to vaulcanization.

In accordance with the present invention, means are taught whereby butyl rubber type polymers may be more effectively halogenated while simultaneously obtaining a composition having improved properties upon curing. Specifically, a mixture of an unhalogenated butyl rubber type copolymer and a polymethylol phenol substance, preferably in the form of a solution in a $C_3$ to $C_{10}$ hydrocarbon solvent, is halogenated at a temperature of about 0 to 150° C., normally about 20 to 80° C., using an appropriate halogenating agent. Preferably sufficient halogen is added so that halogenated copolymer contains at least 0.5 weight percent halogen but not more than about 3 atoms of combined bromine or iodine per double bond in the copolymer, nor more than 1 atom of combined chlorine or fluorine, while simultaneously at least partially halogenating the methylol groups of said resin. The resulting halogenated copolymer has a viscosity average molecular weight of 100,000 to 2,000,000 and a mole percent unsaturation of 0.1 to 20. Generally a blend containing 1 to 20, preferably 2 to 10, weight percent of phenol resin based on rubbery copolymer is subject to halogenation, the phenol resin preferably being a $C_4$ to $C_{16}$ para or meta hydrocarbon substituted polymethylol phenol.

As noted, the halogenation may take place in an organic solution, e.g., or in hexane, carbon tetrachloride, preferably in a solution containing a minor portion of water, or it can be conducted with an aqueous phase present or with the polymer present as a latex. Reaction time may vary from a minute to several hours. Among the halogenating agents which have been found suitable are alkali metal hypochlorites, hypoiodates, hypofluorides or hypobromites, $C_4$ to $C_{10}$ tertiary alkyl hypochlorites or hypobromites, sulfur bromides, sulfuryl chloride, N-bromosuccinimide, N,N'-dichloro - 5,5 - dimethyl-hydantoin, iodine halides, gaseous hydrogen halides, e.g., hydrogen chloride, hydrogen bromide. The preferred halogenating agents are fluorine, chlorine and liquid bromine. The resultant mixture of halogenated butyl and resin may be recovered by a variety of means, e.g., precipitation with a non-solvent such as alcohol or acetone, spray drying, or preferably by a hot water slurry process whereby the hydrocarbon diluent is flashed off. The resultant product may be dried in a vacuum oven, hot mill, degassing extruder, etc.

The halogenated products resulting from the present process have improved polymer and vulcanization properties. Vulcanizates with improved modulus and tensile properties, heat resistance and dynamic properties are obtained. Additionally, the present process accomplishes in a single step that which ordinarily requires at least three steps, i.e., (1) halogenation of the polymer, (2) halogenation of the resin, and (3) mixing the halogenated polymer and resin. It allows an easier and more complete mixing of polymer and resin in solution than can be effected by conventional mechanical mixing. Further, an advantageous co-reaction between copolymer and resin halogenation is obtained. The by-product hydrogen halide from the polymer halogenation is taken up by the resin, the removal of hydrogen halide from the reaction medium helping to prevent rubbery polymer breakdown as well as being a favorable economic factor.

The products of the present halogenation process may be self-cured without addition of conventional curatives. Alternatively they may be compounded with zinc oxide, sulfur, thiuram disulfide and other common curing agents. Curing temperatures of 200° to 400° F., preferably 250° to 350° F. are employed.

The resultant halomethyl hydrocarbon-substituted phenols coming within the purview of the present invention are those which have a hydrocarbon group in the meta or para position. The phenol portion may be either monohydric or polyhydric. The typical form of these curing agents falls under the following general formula:

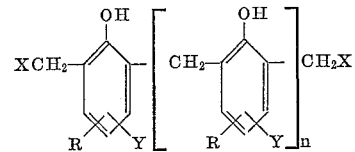

wherein $n$ is an integer from 0 to 20, R is selected from the group consisting of alkyl, aryl and alkaryl hydrocarbon containing 4 to 16 carbon atoms located in the meta or para position (3, 4 or 5 position); X is a halogen; and Y is selected from the group consisting of halogen, hydrogen and a hydroxy radical. Y may be located in the meta or para position not occupied by R (3, 4 or 5 position).

The resultant chlorinated and brominated phenols are preferred. Typical resulting resins coming within the purview of the above formula are the following when $n$ is considered 0 for the purpose of establishing characteristic structures (although $n$ is normally 2 to 10): 2,6-di(chloromethyl) - 4 - tertiarybutyl phenol, 2,6-di(chloromethyl) - 4 - octyl phenol, 2,6-di(bromomethyl)-4-octyl phenol, 2,6 - di(iodomethyl) - 4 - dodecyl phenol, 2,6-di-(chloromethyl)-4-phenyl phenol, 2,6-di(bromomethyl)-5-pentadecyl phenol, 2,6-di(bromomethyl) - 5 - pentadecyl resorcinol, 2,6-di(bromomethyl)-4-cumyl phenol, 2,6-di(chloromethyl)-4-chloro-5-pentadecyl phenol, and 2,6-di(bromomethyl)-3-bromo-p-cresol.

The polymethylol hydrocarbon-substituted phenols that are halogenated as part of the butyl rubber mixture according to the present invention can be prepared by reacting a substituted phenol having the two ortho positions unoccupied with a molar excess of an aldehyde. For instance, 2 moles of formaldehyde may be reacted with a mole of phenol compound in the presence of a strong alkaline catalyst, such as an alkali metal hydroxide, at a temperature between about 25 and 100° C. The monomer may be polymerized by heating at elevated temperatures, e.g., 75 to 175° C. The polymer should be oil soluble and heat reactive. Suitable methods for the preparation of para-substituted dimethylol phenol compounds are described by Honel in U.S. Patent 1,996,069.

The various aspects and modification of the present invention will be made more clearly apparent by reference to the following description and accompanying examples.

EXAMPLE 1

Several samples of halogenated butyl rubber were prepared in the conventional manner and in accordance with the present invention.

*Sample I.*—A hexane solution containing 10 weight percent of a typical butyl rubber copolymer was brominated with 5 parts of bromine per hundred of rubber. The unbrominated butyl rubber was composed of 98.0 weight percent isobutylene, 2.0 weight percent isoprene, had a mole percent unsaturation of 1.6 and a viscosity average molecular weight of 500,000 (intrinsic viscosity of 1.51). The mixture was allowed to react for two hours before being recovered by slurrying in hot water containing 1 phr. of calcium stearate and dried in a vacuum oven at 70° C. overnight.

*Sample II.*—A halogenated butyl rubber was prepared in conventional manner, i.e., addition of 5% bromine to a solution of butyl rubber in hydrous hexane, from a butyl copolymer of 98 weight percent isobutylene, 2 weight percent isoprene, having a mole percent unsaturation of 1.6 and a viscosity average molecular weight of 500,000 (intrinsic viscosity of 1.51). The resultant halogenated butyl rubber contained 2.1 weight percent bromine and an intrinsic viscosity of 1.23.

*Sample III.*—A portion of the halogenated butyl rubber of Sample II was thereafter mixed on a rubber mill with 5 weight percent based on rubber of 2,6-dimethylol-4-octyl phenol resin sold under the name of Amberol ST-137 to form a blend of brominated butyl rubber and dimethylol phenol.

*Sample IV.*—In accordance with the present invention, the same procedure as described in Sample I was employed except that the hexane solution (cement) contained 5 weight percent based on rubbery copolymer of 2,6-dimethylol-4-octyl phenol resin (Amberol ST-137) prior to being subjected to halogenation, and the product after oven drying was further dried at 212° F. for 8 minutes on a rubber mill.

*Sample V.*—A hexane solution containing 10 weight percent of the butyl rubber indicated in Sample I was brominated in the same manner indicated in Sample I except that after 3 minutes of bromine addition, 5 weight percent based on rubber of 2,6-dimethylol-4-octyl phenol resin was added to the reaction mixture. The reaction was continued and products recovered in the same manner as indicated in Sample I.

Samples IV and V illustrate compositions prepared in accordance with the present invention.

Table I compares the molecular weights of the halogenated products of Samples I, IV and V.

Table I

| Sample | Total wt. percent bromine | | Intrinsic viscosity |
|--------|---------------------------|----------------------|---------------------|
|        | Added | In polymer (and resin) |  |
| I | 5.0 | 2.1 | 0.91 |
| IV | 5.0 | 2.2 | 1.29 |
| V | 5.0 | 2.2 | 1.15 |

The presence of the resin in Samples IV and V tends to decrease the intrinsic viscosity of the polymer mixture (as opposed to the polymer alone) since the resin has a low molecular weight of about $1/1000$ that of butyl. As seen from Table I, in spite of this influence the intrinsic viscosity (molecular weight) of the halogenated resin-polymer mixture of the present invention is still considerably higher than control Sample I, thus demonstrating that the presence of the phenol resin during halogenation gave excellent protection against molecular weight breakdown of the rubber copolymer during halogenation. A comparison of Samples IV and V further illustrates this effect by showing a lower molecular weight polymer is obtained when the resin is added after partial halogenation of the rubbery copolymer than if it were present during the entire halogenation.

EXAMPLE 2

The polymer products of Samples II to V were cured by three formulations shown in Table II which include: (1)

Table II.—Vulcanization of Butyl Halogenated in the Presence of Phenol-Formaldehyde Resins

| Compound | 1 | 2 | 3 | 4 | 5 | 6 | 7 | 8 | 9 | 10 |
|---|---|---|---|---|---|---|---|---|---|---|
| Sample II (Bromobutyl control) | 100 | | | | | | | | | |
| Sample III (Bromobutyl control) | | 100 | 100 | 100 | | | | | | |
| Sample IV | | | | | 100 | 100 | 100 | | | |
| Sample V | | | | | | | | 100 | 100 | 100 |
| Carbon black (Philblac-O) | 50 | 50 | 50 | 50 | 50 | 50 | 50 | 50 | 50 | 50 |
| Stearic acid | 1.0 | 1.0 | 1.0 | 1.0 | 1.0 | 1.0 | 1.0 | 1.0 | 1.0 | 1.0 |
| Zinc oxide | 5.0 | 5.0 | 5.0 | 5.0 | 5.0 | 5.0 | 5.0 | 5.0 | 5.0 | 5.0 |
| 2,6-dimethylol-4-octyl phenol resin | | 5.0 | 5.0 | 5.0 | | | | | | |
| Tetramethyl thiuram disulfide | | | | 1 | | | 1 | | 1 | 1 |
| Sulfur | | | | 2 | | 1 | 2 | | | 2 |
| PROPERTIES | | | | | | | | | | |
| Cured 30' at 307° F.: | | | | | | | | | | |
| Modulus, p.s.i./300% | 1,200 | 1,960 | 1,890 | 1,760 | 2,150 | 1,985 | 1,895 | | 2,000 | 1,840 |
| Tensile strength, p.s.i. | 1,980 | 2,020 | 2,110 | 2,175 | 2,500 | 2,345 | 2,355 | 2,335 | 2,200 | 2,420 |
| Cured 45' at 307° F.: | | | | | | | | | | |
| Modulus, p.s.i./300% | 1,420 | 2,100 | 2,015 | 1,730 | 2,410 | 2,135 | 2,020 | 2,135 | 2,260 | 1,940 |
| Tensile strength, p.s.i. | 1,930 | 2,200 | 2,030 | 2,180 | 2,410 | 2,410 | 2,490 | 2,335 | 2,390 | 2,500 |
| Cured 60' at 307° F.: | | | | | | | | | | |
| Modulus, p.s.i./300% | 1,290 | 2,105 | 1,985 | 1,820 | | 2,135 | 1,910 | 2,175 | 2,000 | 1,885 |
| Tensile strength, p.s.i. | 2,000 | 2,335 | 1,950 | 2,270 | | 2,350 | 2,525 | 2,410 | 2,335 | 2,535 |
| Oven aged 48 hrs./300° F., cured 45' at 307° F.: | | | | | | | | | | |
| Modulus, p.s.i./300% | 500 | | 930 | 750 | | 1,205 | 935 | | 1,150 | 865 |
| Tensile strength, p.s.i. | 500 | 1,000 | 930 | 855 | 1,250 | 1,205 | 1,045 | 1,205 | 1,150 | 1,000 |
| Elongation, percent | 300 | 235 | 300 | 405 | 185 | 300 | 330 | 190 | 300 | 360 |
| Goodrich Flexometer, 45'/307° F.: | | | | | | | | | | |
| Dynamic drift, percent | 6.5 | 0.4 | 1.6 | 9.6 | 0.0 | 1.1 | 8.7 | 1.0 | 0.9 | 7.9 |
| Final dyn. comp., percent | 18.6 | 3.9 | 4.5 | 13.4 | 1.2 | 2.4 | 10.7 | 3.8 | 2.9 | 10.8 |
| Comp. set, percent | 7.2 | 2.2 | 3.2 | 9.3 | 1.3 | 2.4 | 8.8 | 2.1 | 2.2 | 8.4 |
| Yerzley, 45'/307° F.: | | | | | | | | | | |
| $\eta$, Internal vis.$\times 10^{-5}$, poises | 4.79 | 4.34 | 4.61 | 4.39 | 3.44 | 3.59 | 3.68 | 3.61 | 3.48 | 3.64 |
| $\eta f$, Abs. damp.$\times 10^{-6}$, poises$\times$cps | 4.12 | 4.22 | 5.22 | | 3.19 | 3.62 | | 3.16 | 3.33 | |
| K, dyn. mod.$\times 10^{-7}$, dynes/cm | 8.49 | 9.39 | 11.34 | | 8.81 | 9.69 | | 8.27 | 8.99 | |
| Relative damping, percent | 32.51 | 30.46 | 31.00 | 29.94 | 25.32 | 25.97 | 27.16 | 26.47 | 25.79 | 26.65 | a zinc oxide cure, (2) a zinc oxide-tetramethyl thiuram disulfide cure, and (3) a zinc oxide-sulfur-tetramethyl thiuram disulfide cure, under the conditions indicated, the proportion of ingredients shown being in parts by weight. The compounding ingredients were mixed on a rubber mill. Vulcanizates were treated by standard test procedures. Compounds 1 to 4 illustrate the practices of the prior art while compounds 5 to 10 illustrate the practice of the present invention.

As shown by the results of Table II, vulcanizates prepared from the halogenated butyl-resin products of the present invention had excellent physical properties. Vulcanizates containing the present compositions (Samples IV and V) were superior to either halogenated butyl alone, or halogenated butyl to which a methylol-phenol resin had been subsequently added (Samples II and III) with respect to (1) modulus and tensile properties, (2) cure rate (cure time required to obtain a given standard of properties), (3) resistance to heat aging, and (4) dynamic properties (flexometer and Yerzley). Example 2 therefore illustrates that improved vulcanizates are obtained from the compositions of the present invention.

In summary, in accordance with the present invention a new rubbery composition of matter giving an improved vulcanizate is obtained by a highly efficient process. The co-halogenation of resin and rubbery copolymer gives an advantageous co-action whereby the resin takes up hydrogen halide from the polymer halogenation and helps to prevent polymer molecular weight breakdown.

Having described the present invention, that which is sought to be protected is set forth in the following claims.

What is claimed is:

1. A composition comprising a major portion of a halogenated copolymer of 85 to 99.5 weight percent of a $C_4$ to $C_8$ isoolefin and 0.5 to 15.0 weight percent of a $C_4$ to $C_{14}$ multiolefin and a minor portion of a halogenated polymethylol, $C_4$ to $C_{16}$ hydrocarbon substituted phenol resin; said copolymer and said resin having been concurrently halogenated in an admixture.

2. The composition of claim 1 wherein said resin contains halogen-substituted methylol groups and said copolymer contains at least 0.5 weight percent halogen.

3. The composition of claim 1 wherein said resin contains hydrocarbon substituents in a position selected from the group consisting of meta and para.

4. A composition comprising a major portion of a halogenated copolymer of 85 to 99.5 weight percent of a $C_4$ to $C_8$ isoolefin and 0.5 to 15.0 weight percent of a $C_4$ to $C_{14}$ multiolefin and a minor portion of a halogenated polymethylol, $C_4$ to $C_{16}$ hydrocarbon para-substituted phenol resin, said copolymer containing at least 0.5 weight percent halogen but no more than 3 atoms of combined halogen per double bond; said copolymer and said resin having been concurrently halogenated in an admixture.

5. A process which comprises forming an admixture of an unhalogenated rubber copolymer of isobutylene with isoprene and unhalogenated 2,6-dimethylol-4-octyl phenol resin; contacting said admixture at a temperature between 0° and 150° C. with a halogenated agent to concurrently incorporate halogen in both said copolymer and said resin; recovering a blend of said halogenated copolymer and said halogenated resin; and curing said blend in the absence of other curatives to provide a vulcanizate therefrom.

6. An improved method for producing a rubbery composition which comprises mixing an unhalogenated copolymer of 85 to 99.5 weight percent of a $C_4$ to $C_8$ isoolefin and 0.5 to 15 weight percent of a $C_4$ to $C_{14}$ multiolefin with an unhalogenated polymethylol $C_4$ to $C_{16}$ hydrocarbon substituted phenol resin, contacting the resultant mixture with a halogenating agent at a temperature of about 0 to 150° C. for a time sufficient to halogenate both said copolymer and said resin, and recovering as an admixture a halogenated copolymer and a halogenated resin.

7. The process of claim 6 where the unhalogenated copolymer is mixed with 1 to 20 weight percent, based on copolymer, of the unhalogenated resin.

8. The process of claim 6 where a sufficiently large amount of halogenating agent is employed so that the halogenated copolymer contains at least 0.5 weight percent of combined halogen but not more than 3 atoms of combined halogen per double bond.

9. The process of claim 6 where the halogenated resin recovered is represented by the following formula:

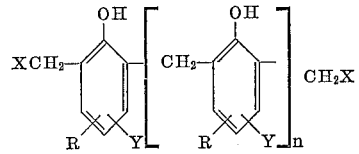

wherein R is selected from the group consisting of $C_4$ to $C_{16}$ alkyl, aryl and alkaryl hydrocarbons; X is a halogen; and Y is selected from the group consisting of halogen, hydrogen and a hydroxy radical, and $n$ is an integer from 0 to 20.

10. The process of claim 6 where the hydrocarbon substituent of the resin is in the para position of the phenol nucleus.

11. The process of claim 6 where the unhalogenated resin is 2,6-dimethylol-4-octyl phenol resin.

12. The process of claim 8 where the halogenating agent is a brominating agent.

13. The process of claim 8 where the halogenating agent is a chlorinating agent and the halogenated copolymer obtained contains not more than one atom of combined chlorine per double bond.

References Cited in the file of this patent
UNITED STATES PATENTS

| | | |
|---|---|---|
| 2,732,354 | Morrissey et al. | Jan. 24, 1956 |
| 2,943,988 | Canterino | July 5, 1960 |
| 2,955,102 | Clayton et al. | Oct. 4, 1960 |
| 2,959,562 | Klug | Nov. 8, 1960 |
| 2,967,167 | Minckler et al. | Jan. 3, 1961 |
| 2,972,600 | Braidwood | Feb. 21, 1961 |
| 3,037,954 | Gessler et al. | June 5, 1962 |
| 3,039,978 | Fusco et al. | June 19, 1962 |